(12) United States Patent
Kusafuka

(10) Patent No.: US 11,221,482 B2
(45) Date of Patent: Jan. 11, 2022

(54) DISPLAY APPARATUS, DISPLAY SYSTEM, AND MOBILE BODY

(71) Applicant: KYOCERA Corporation, Kyoto (JP)

(72) Inventor: Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 171 days.

(21) Appl. No.: 16/660,703

(22) Filed: Oct. 22, 2019

(65) Prior Publication Data

US 2020/0049991 A1 Feb. 13, 2020

Related U.S. Application Data

(63) Continuation of application No. PCT/JP2018/016862, filed on Apr. 25, 2018.

(30) Foreign Application Priority Data

Apr. 26, 2017 (JP) .............................. JP2017-087712
Apr. 26, 2017 (JP) .............................. JP2017-087714

(51) Int. Cl.
*G02B 27/01* (2006.01)
*B60K 35/00* (2006.01)

(52) U.S. Cl.
CPC ..... *G02B 27/0101* (2013.01); *G02B 27/0149* (2013.01); *G02B 27/0179* (2013.01);
(Continued)

(58) Field of Classification Search
CPC .... G03B 21/008; G03B 21/28; G03B 21/208; G03B 21/2013; G03B 21/2033; G03B 21/2053; G02B 27/095; G02B 27/0955; G02B 27/0101; G02B 27/0103; G02B 27/0172; G02B 27/0179; G02B 2027/014; G02B 2027/0105; G02B 2027/0134;
(Continued)

(56) References Cited

U.S. PATENT DOCUMENTS

| 2009/0279025 | A1* | 11/2009 | Machidori | ........ G02F 1/133512 |
| | | | | 349/110 |
| 2011/0090419 | A1 | 4/2011 | Yokoyama | |
| 2015/0268479 | A1* | 9/2015 | Woodgate | ............ G02B 6/0035 |
| | | | | 349/15 |

(Continued)

FOREIGN PATENT DOCUMENTS

| JP | H06-115381 A | 4/1994 |
| JP | 2004-343290 A | 12/2004 |

(Continued)

*Primary Examiner* — Sultan Chowdhury
(74) *Attorney, Agent, or Firm* — Studebaker & Brackett PC

(57) ABSTRACT

A display apparatus includes a display element, an optical element, a projection optical system, a driver, and a controller. The display element includes a display surface having subpixels arranged in a grid pattern along a first direction and a second direction approximately orthogonal to the first direction. The optical element is configured to define a beam direction of image light emitted from the subpixels in each of strip-shaped regions that extend in the second direction on the display surface. The projection optical system is configured to project image light having the beam direction defined by the optical element to form a virtual image of the display surface. The driver is configured to displace the optical element. The controller is configured to displace the optical element using the driver.

14 Claims, 14 Drawing Sheets

(52) U.S. Cl.
CPC ...... *B60K 35/00* (2013.01); *B60K 2370/1529* (2019.05); *B60K 2370/73* (2019.05); *G02B 2027/0159* (2013.01); *G02B 2027/0187* (2013.01)

(58) Field of Classification Search
CPC .... G02B 2027/0159; G02B 2027/0174; G02B 2027/0187; G02B 2027/123; B60K 2370/31; B60K 2370/73; B60K 2370/177; B60K 2370/334; B60K 2370/785; B60K 2370/1523; B60K 2370/1529; B60K 2370/1531
See application file for complete search history.

(56) References Cited

U.S. PATENT DOCUMENTS

| | | | | |
|---|---|---|---|---|
| 2016/0173867 A1* | 6/2016 | Ichihashi | ............... | H04N 13/31 348/54 |
| 2016/0227199 A1* | 8/2016 | Goeke | ................. | H04N 13/337 |
| 2017/0155895 A1* | 6/2017 | Kroon | ................. | H04N 13/324 |
| 2017/0371192 A1* | 12/2017 | Coleman | ............... | G02B 30/25 |
| 2018/0120562 A1* | 5/2018 | Yata | .................... | G02B 27/283 |

FOREIGN PATENT DOCUMENTS

| | | | |
|---|---|---|---|
| JP | 2008-268485 | A | 11/2008 |
| JP | 2009-008722 | A | 1/2009 |
| JP | 2011-085790 | A | 4/2011 |
| JP | 2012-242443 | A | 12/2012 |
| JP | 2014-068331 | A | 4/2014 |
| WO | 2015/168464 | A1 | 11/2015 |

\* cited by examiner

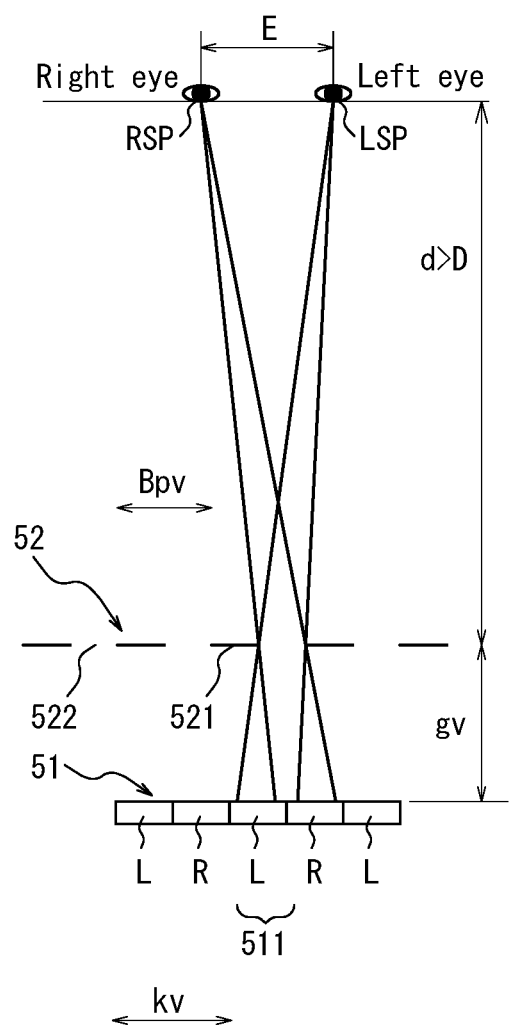

DISPLAY APPARATUS, DISPLAY SYSTEM, AND MOBILE BODY

CROSS REFERENCE TO RELATED APPLICATION

The present application is a Continuing Application based on International Application PCT/JP2018/016862 filed on Apr. 25, 2018, which in turn claims priority to Japanese Patent Applications No. 2017-087712 filed on Apr. 26, 2017 and No. 2017-087714 filed on Apr. 26, 2017, the entire disclosure of these earlier applications being incorporated herein by reference.

BACKGROUND

Conventionally, three-dimensional display apparatuses that display a three-dimensional image without the need for a viewer to wear eyeglasses are known. Such three-dimensional displays include an optical element for transmitting a portion of image light emitted from an image display panel to a right eye and another portion of image light to a left eye.

SUMMARY

A display apparatus according to the present disclosure includes a display element, an optical element, a projection optical system, a driver, and a controller. The display element includes a display surface having subpixels arranged in a grid pattern along a first direction and a second direction substantially orthogonal to the first direction. The optical element is configured to define a beam direction of image light emitted from subpixels in each of strip-shaped regions extending in the second direction on the display surface. The projection optical system is configured to project image light having the beam direction defined by the optical element to form a virtual image of the display surface. The driver is configured to displace the optical element along a direction normal to the display surface. The controller is configured to displace the optical element using the driver.

A display system according to the present disclosure includes an imaging apparatus and a display apparatus. The imaging apparatus captures an image of a user. The display apparatus includes a communication interface, a display element, an optical element, a projection optical system, a driver, and a controller. The communication interface receives position information regarding a position of a users eye captured by the imaging apparatus. The display element includes a display surface having subpixels arranged in a grid pattern along a first direction and a second direction substantially orthogonal to the first direction. The optical element defines a beam direction of image light emitted from subpixels in each of strip-shaped regions extending in the second direction on the display surface. The projection optical system is configured to project image light having the beam direction defined by the optical element to form a virtual image of the display surface. The driver is configured to displace the optical element along a direction normal to the display surface. The controller is configured to displace the optical element using the driver.

A mobile body according to the present disclosure includes a display system. The display system includes an imaging apparatus and a display apparatus. The imaging apparatus captures an image of a user. The display apparatus includes a communication interface, a display element, an optical element, a projection optical system, a driver, and a controller. The communication interface receives position information regarding a position of a users eye captured by the imaging apparatus. The display element includes a display surface having subpixels arranged in a grid pattern along a first direction and a second direction substantially orthogonal to the first direction. The optical element defines a beam direction of image light emitted from subpixels in each of strip-shaped regions extending in the second direction on the display surface. The projection optical system is configured to project the image light having the beam direction defined by the optical element to form a virtual image of the display surface. The driver is configured to displace the optical element along a direction normal to the display surface. The controller is configured to displace the optical element using the driver.

BRIEF DESCRIPTION OF THE DRAWINGS

In the accompanying drawings:

FIG. 6C is a schematic diagram for explaining subpixels of a first virtual image visible to the eyes when a distance between the parallax barrier and the eyes is longer than the distance between the parallax barrier and the reference position;

DETAILED DESCRIPTION

According to the display apparatuses described above, phenomena such as crosstalk and image reversal that hinder normal image recognition are known. When the display apparatuses described above are used as a head-up display, comfort in viewing the three-dimensional display would be improved if the phenomena such as crosstalk and image reversal could be suppressed even when a user's eyes move from a predetermined position.

It would be helpful to provide a display apparatus, a display system, and a mobile body that improve the comfort in viewing a three-dimensional image on a head-up display.

According to an embodiment of the present disclosure, it is possible to improve comfort in viewing a three-dimensional image on a head-up display.

Hereinafter, a first embodiment of the present disclosure will be described in detail with reference to the drawings. Note that the diagrams used in the following description are schematic and not necessarily drawn to scale.

Figure 1:
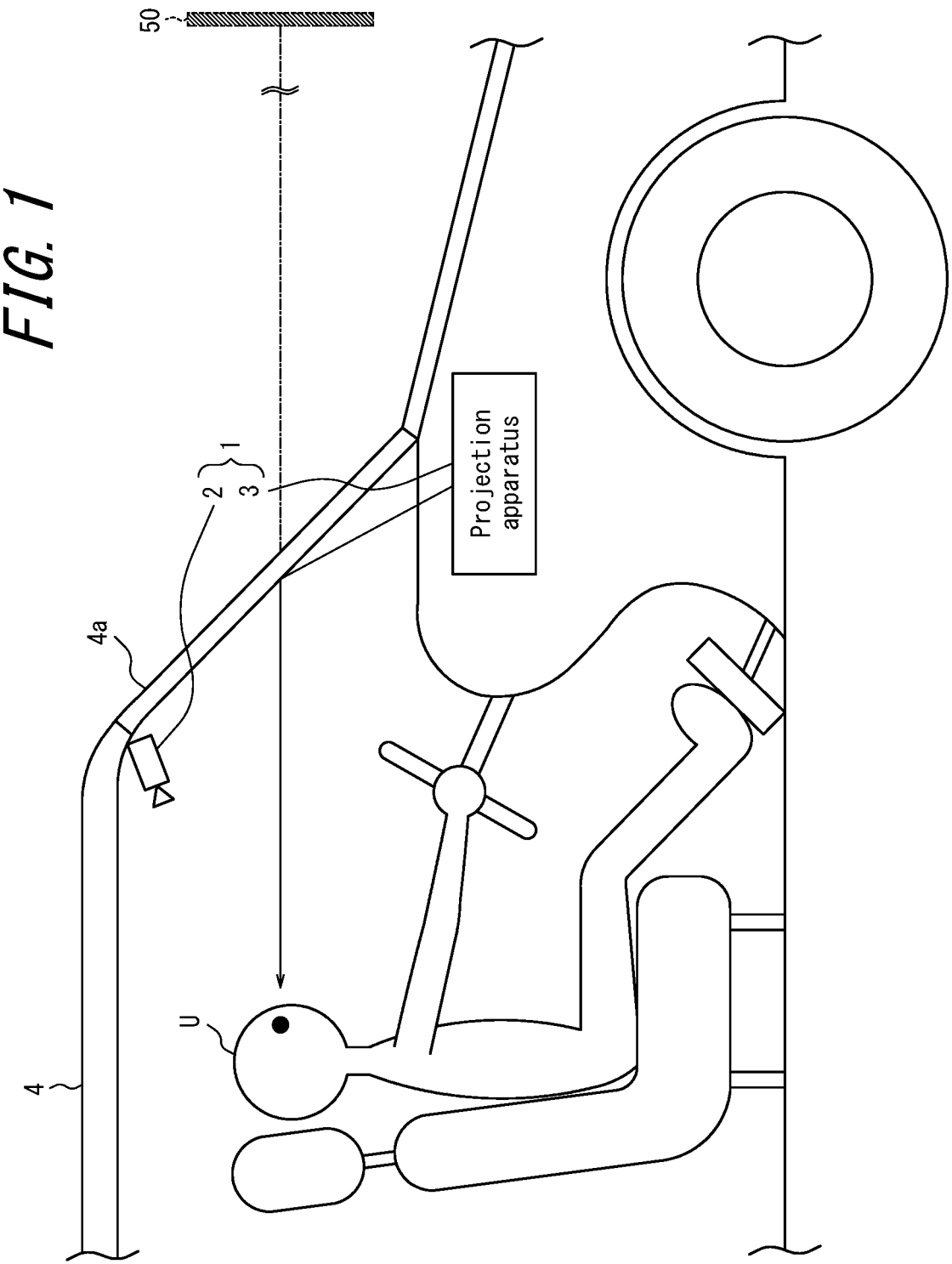
FIG. 1 is a diagram illustrating a display system mounted in a mobile body according to a first embodiment of the present disclosure.

A display system 1 according to the first embodiment includes a detection apparatus 2 and a projection apparatus 3 as illustrated in FIG. 1. The projection apparatus 3 is mounted in a mobile body 4. For example, the projection apparatus 3 is accommodated in the dashboard of the mobile body 4.

The term "mobile body" used herein may encompass, and is not limited to, automobiles, rail vehicles, industrial vehicles, and domestic vehicles. For example, the "mobile body" may include fixed-wing aircraft that travel on a runway. Automobiles may include, for example, cars, trucks, buses, motorcycles, and trolley buses. Automobiles are not limited thereto and may include other automobiles that travel on the road. Rail vehicles include, for example, locomotives, wagons, passenger cars, trams, guided railroads, ropeways, cable cars, linear motor cars, and monorails. Rail vehicles are not limited thereto and may include other vehicles that travel along a track. Industrial vehicles may include agricultural vehicles and construction vehicles. Industrial vehicles may include, and are not limited to, forklifts and golf carts. Industrial vehicles for agricultural purposes may include, but are not limited to, tractors, tillers, transplanters, binders, combine harvesters, and lawn mowers. Industrial vehicles for construction purposes may include, but are not limited to, bulldozers, scrapers, excavators, crane trucks, dump trucks, and load rollers. Domestic vehicles may include, but are not limited to, bicycles, wheelchairs, baby strollers, wheelbarrows, and electric standing two-wheelers. Vehicle drive units may include, but are not limited to, internal combustion engines such as diesel engines, gasoline engines, and hydrogen engines, and electrical engines such as motors. The vehicles may include human-powered vehicles which travel on human power. Classification of the vehicles is not limited to the above. For example, the vehicles may include industrial vehicles authorized to travel on the road, and categories may include the same types of vehicles.

The detection apparatus 2 is configured to detect positions of the eyes of a user U and transmits the detected positions of the eyes to the projection apparatus 3. The detection apparatus 2 may include, for example, an imaging apparatus. The imaging apparatus of the detection apparatus 2 may capture an image of the eyes of the user U as a subject. The detection apparatus 2 may detect the positions of the eyes of the user U from the captured image. The detection apparatus 2 may detect the positions of the eyes of the user U as coordinates in a three-dimensional space based on one captured image. The detection apparatus 2 may include two or more imaging apparatuses and may detect the positions of the eyes of the user U as coordinates in the three-dimensional space based on a captured image captured by each of the imaging apparatuses.

The detection apparatus 2 does not need to include a camera and can be connected to an external camera. The detection apparatus 2 may include an input terminal for receiving a signal input from the external camera. In this case, the external camera may be directly connected to the input terminal. The external camera may be indirectly connected to the input terminal via a common network. The detection apparatus 2 may detect the positions of the eyes of the user U based on an image signal input to the input terminal.

The detection apparatus 2 may include, for example, a sensor. The sensor may be an ultrasonic sensor, an optical sensor, or the like. The detection apparatus 2 may detect a position of a head of the user U using the sensor and detect the positions of the eyes of the user U based on the position of the head. The detection apparatus 2 may detect positions of the eyes of the user U as coordinates in a three-dimensional space by using two or more sensors.

The projection apparatus 3 functions, for example, as a part of a head-up display that displays a virtual image 50 of a desired image to the user U of the mobile body 4. The projection apparatus 3 according to an embodiment is configured to emit image light, which will be described later, toward a predetermined region of an optical member 4a of the mobile body 4. Image light is reflected by the predetermined region of the optical member 4a and reaches the eyes of the user U. In this way, the projection apparatus 3 functions as a head-up display. In an embodiment, the optical member 4a may be a windshield. In another embodiment, the optical member 4a may be a combiner.

Figure 2:
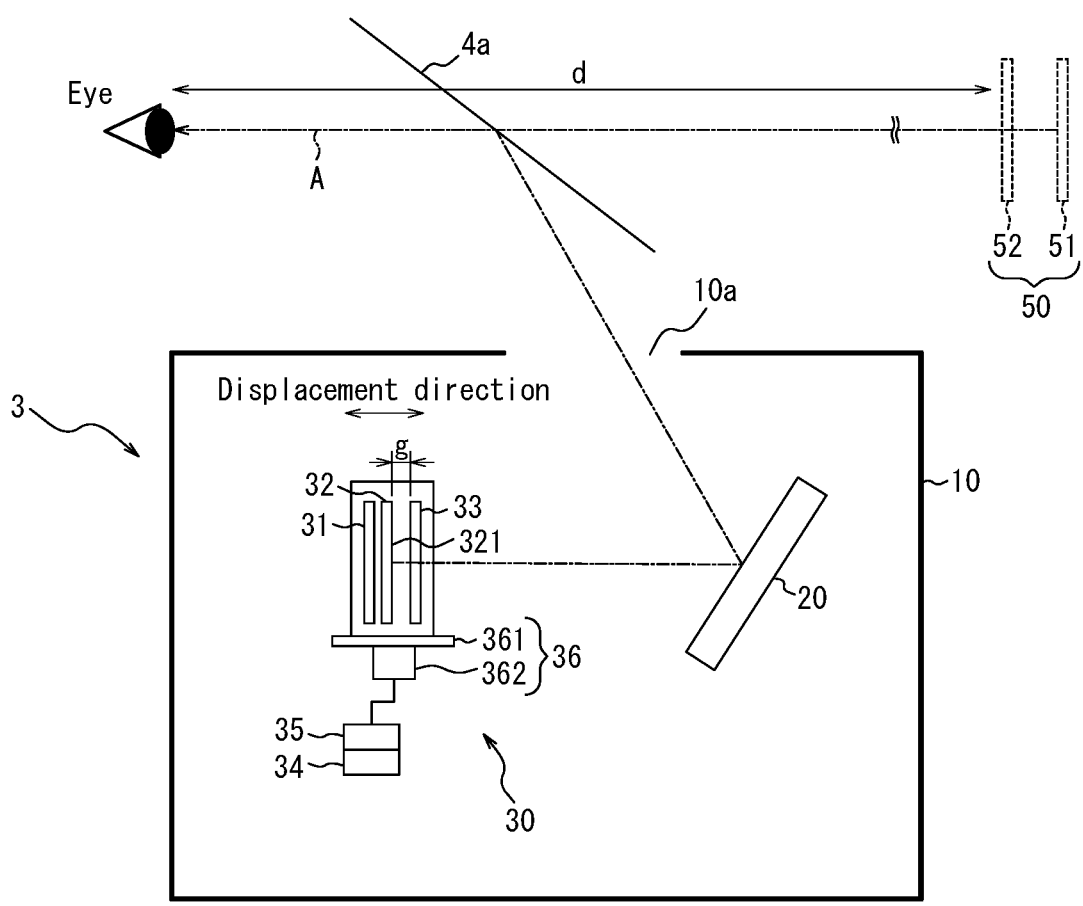
FIG. 2 is a diagram illustrating a schematic configuration of a display apparatus illustrated in FIG. 1.

The projection apparatus 3 according to an embodiment will be described in detail with reference to FIG. 2. The projection apparatus 3 includes a housing 10, a projection optical system 20, and a display apparatus 30.

The housing 10 accommodates the projection optical system 20 and the display apparatus 30. The housing 10 is configured to define an opening 10a through which image light emitted from the display apparatus 30 exits to the outside.

The projection optical system 20 is configured to project image light emitted from the display apparatus 30 to the outside of the projection apparatus 3. The image light that reaches the outside of the projection apparatus 3 reaches the predetermined region of the optical member 4a of the mobile body 4 as illustrated in FIG. 1. The projection optical system 20 may include one or more mirrors or lenses. For cases in which the projection optical system 20 includes a mirror, the mirror may be, for example, a concave mirror. In FIG. 2, the projection optical system 20 is illustrated as one mirror. However, the projection optical system 20 may be configured by combining one or more mirrors, lenses, or other optical elements. The dashed-line arrow A illustrated in FIG. 2 indicates the path of a portion of image light that is emitted from the display apparatus 30, reflected by the projection optical system 20, passes through the opening 10a formed on the housing 10 of the projection apparatus 3, and then reaches the outside of the projection apparatus 3.

The display apparatus 30 is accommodated in the housing 10 and is configured to emit image light. The display apparatus 30 includes an emitter 31, a display panel 32 serving as a display element, a parallax barrier 33 serving as an optical element, a communication interface 34, a controller 35, and a driver 36.

The emitter 31 is arranged on one surface side of the display panel 32 and irradiates the surface of the display panel 32. The emitter 31 may include a light source, a light guide plate, a diffusion plate, a diffusion sheet, and the like. In the emitter 31, the light source is configured to emit illumination light which is then homogenized in a direction of the surface of the display panel 32 by the light guide plate, the diffusion plate, the diffusion sheet, and the like. The emitter 31 is configured to emit the homogenized light to the display panel 32.

Figure 3:
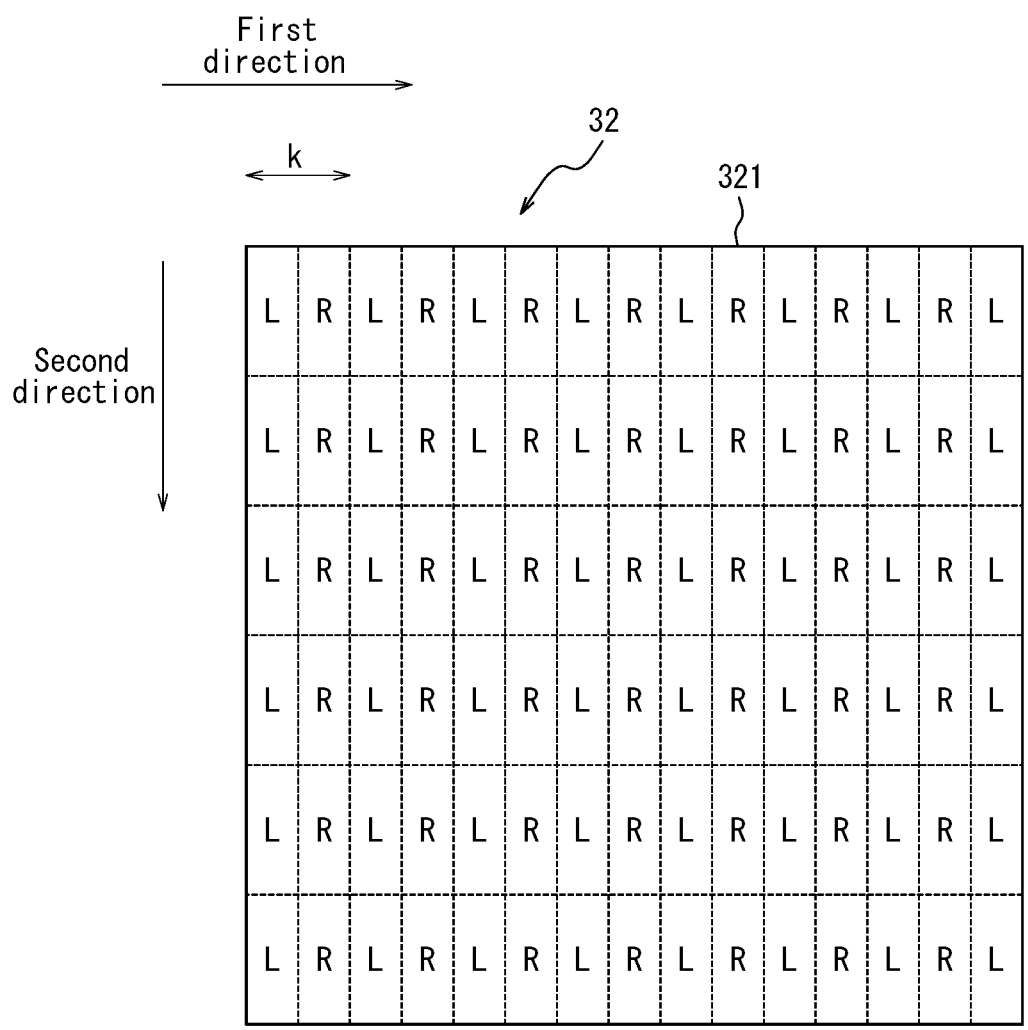
FIG. 3 is a diagram illustrating a display panel illustrated in FIG. 2 viewed from a normal direction of a display surface.

The display panel 32 may be, for example, a transmitting liquid crystal display panel. The display panel 32 includes partitioned areas arranged in a grid pattern along a first direction and a second direction approximately orthogonal to the first direction on a display surface 321, which is a plate-like surface, as illustrated in FIG. 3. The first direction and the second direction correspond to the horizontal direction and the vertical direction, respectively, when the virtual image of the display panel 32 is viewed by the user U. The grid pattern indicates a regular planar arrangement in two directions approximately orthogonal to each other. Each of the partitioned areas corresponds to one subpixel.

Each of the subpixels corresponds to one of the colors R (Red), G (Green), and B (Blue). Three subpixels respectively corresponding to R, G, and B as a group may constitute one pixel. One pixel may be referred to as one image element. The first direction may be, for example, a direction in which a plurality of subpixels that constitute one pixel are arranged. The second direction may be, for example, a direction in which subpixels of the same color are arranged. The display panel 32 is not limited to a transmitting liquid crystal display panel and may be another display panel such as an organic EL display panel. When the display panel 32 is a self-luminous display panel, the emitter 31 may be omitted.

The display panel 32 of the first embodiment includes a plurality of subpixels in columns for displaying a left-eye image that are continuously arranged in the second direction and alternately arranged in the first direction, as illustrated in FIG. 3. The plurality of subpixels in columns for displaying a right-eye image are arranged adjacent to the respective columns in an alternating manner. In FIG. 3, the subpixels for displaying the left-eye image are represented by L and the subpixels for displaying the right-eye image are represented by R. In the first embodiment, k represents an arrangement interval of the left-eye images, i.e., a total length of a left-eye image in the first direction and a right-eye image in the first direction, as illustrated in FIG. 3. Because the left-eye images and the right eye images are alternately arranged in the first direction, the image pitch k corresponds also to an arrangement interval of the right-eye images.

Figure 4:
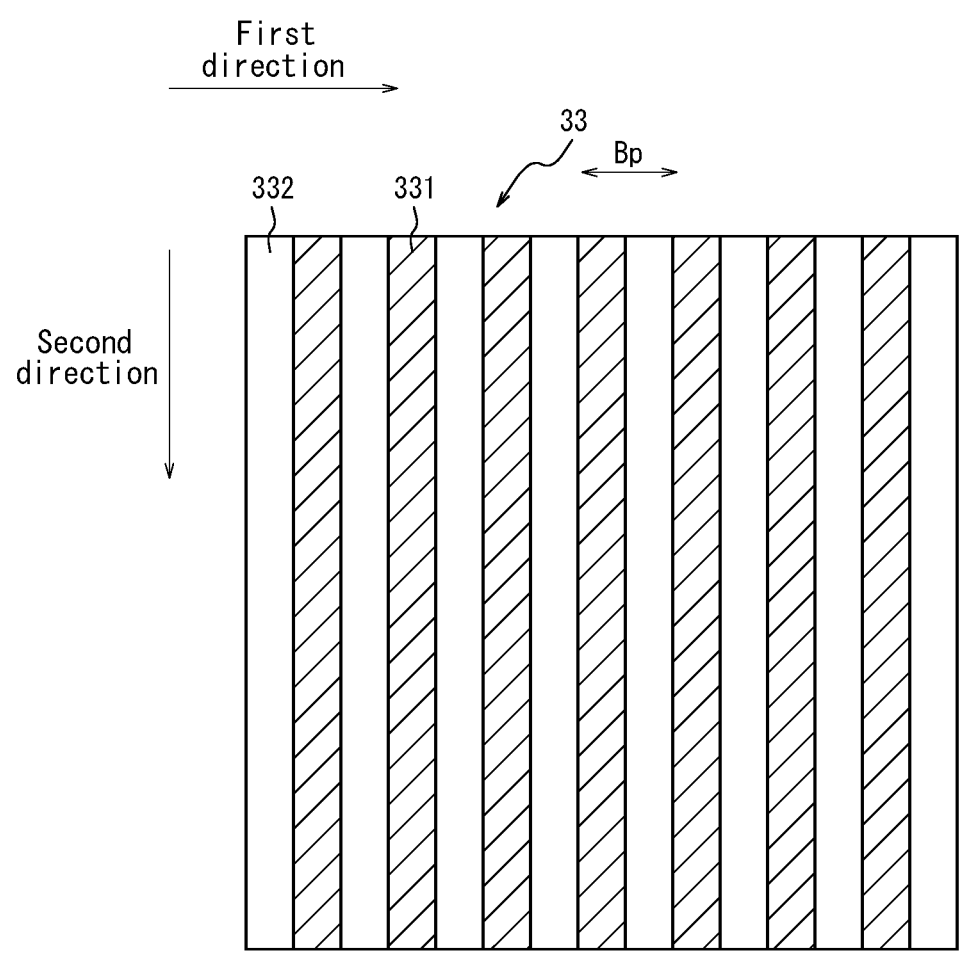
FIG. 4 is a diagram illustrating a parallax barrier illustrated in FIG. 2 viewed from a nominal direction of a light shielding surface.

The parallax barrier 33 is an optical element that is configured to define a beam direction for propagation of image light emitted from the subpixels. The parallax barrier 33 includes transmitting regions 332 extending in the second direction of the display apparatus 30 as illustrated in FIG. 4. The transmitting regions 332 is configured to define a beam direction that is a propagation direction of image light emitted from each of the subpixels. The extent to which image light that is emitted by the subpixels is visible to each of the right eye and the left eye is determined by the parallax barrier 33. In an embodiment, the parallax barrier 33 is arranged on an opposite side of the emitter 31 across the display panel 32 as illustrated in FIG. 2. The parallax barrier 33 may be arranged on the same side as the emitter 31 with respect to the display panel 32.

In particular, the parallax barrier 33 includes light shielding surfaces 331 extending strip-like in the second direction. Each of the light shielding surfaces 331 forms a shielding region of the parallax barrier 33. The light shielding surfaces 331 block respective portions of image light emitted from the subpixels. The light shielding surfaces 331 may block image light that is emitted from subpixels displaying the left-eye image and directed to the right eye of the user U. The light shielding surfaces 331 may block image light that is emitted from subpixels displaying the right-eye image and directed to the left eye of the user U. A light shielding surfaces 331 adjacent to each other define transmitting regions 332 therebetween. The transmitting regions 332 have higher light transmittance than the light shielding surfaces 331.

The transmitting regions 332 are portions for transmitting light incident on the parallax barrier 33. The transmitting regions 332 may transmit light in the visible range at a transmittance of a first predetermined value or more. The first predetermined value may be, for example, 100% or less. The light shielding surfaces 331 are portions for blocking light in the visible range that is incident on the parallax barrier 33. In other words, the light shielding surfaces 331 block the image displayed on the display apparatus 30. The light shielding surfaces 331 may block light at a transmittance of a second predetermined value or less. The second predetermined value may be, for example, 0% or a value approximate thereto. For example, the first predetermined value may be 50% or more. The second predetermined value may be 10% or less.

The transmitting regions 332 and the light shielding surfaces 331 are alternately arranged in the first direction. The transmitting regions 332 is configured to define the beam directions of image light emitted from the subpixels in each of strip-shaped regions extending in the second direction of the display surface 321.

The parallax barrier 33 may be configured as a film or a plate-like member having a transmittance lower than the second predetermined value. In this case, the light shielding surfaces 331 are configured as the film or the plate-like member. The transmitting regions 332 may be configured as openings formed in the film or the plate-like member. The film may be made of a resin or any other appropriate material. The plate-like member may be made of a resin, a metal, or any other appropriate material. The parallax barrier 33 is not limited to a film or a plate-like member and may be configured as a different type of member. The parallax barrier 33 may include a substrate having a light-shielding property or a substrate to which a light-shielding additive is added.

The parallax barrier 33 may be configured as a liquid crystal shutter. The liquid crystal shutter can control the light transmittance in accordance with an applied voltage. The liquid crystal shutter may include image elements and is configured to control a light transmittance of each of the image elements. The liquid crystal shutter can form regions with high light-transmittance region or regions with low light-transmittance region with any shape. In a case in which the parallax barrier 33 is configured as a liquid crystal shutter, the transmitting regions 332 may be areas having a light transmittance at the first predetermined value or higher. In a case in which the parallax barrier 33 is configured as a liquid crystal shutter, the light shielding surfaces 331 may be areas having a light transmittance at the second predetermined value or lower.

The parallax barrier 33 is configured to transmit image light emitted from some subpixels to the position of the left eye of the user U through the transmitting regions 332. The parallax barrier 33 is configured to transmit image light emitted from the other subpixels to the position of the right eye of the user U through the transmitting regions 332. The parallax barrier 33 is arranged at a distance g (hereinafter, referred to as "gap g") from the display surface 321 of the display panel 32 as illustrated in FIG. 2.

A portion of image light emitted from the display surface 321 of the display panel 32 is transmitted through the parallax barrier 33 and reaches the optical member 4a via the projection optical system 20. Further, image light is reflected by the optical member 4a and reaches the eyes of the user U. Thus, the eyes of the user U view a first virtual image 51, which is a virtual image of the display panel 32, forward of the optical member 4a. Herein, forward as used herein corresponds to the direction to the optical member 4a as viewed from the user U. Forward corresponds to the usual moving direction of the mobile body 4. Accordingly, the user U apparently views an image as if the direction of image light from the first virtual image 51 is defined via a second virtual image 52 serving as a virtual image of the parallax barrier 33 as illustrated in FIG. 2.

Figure 5:
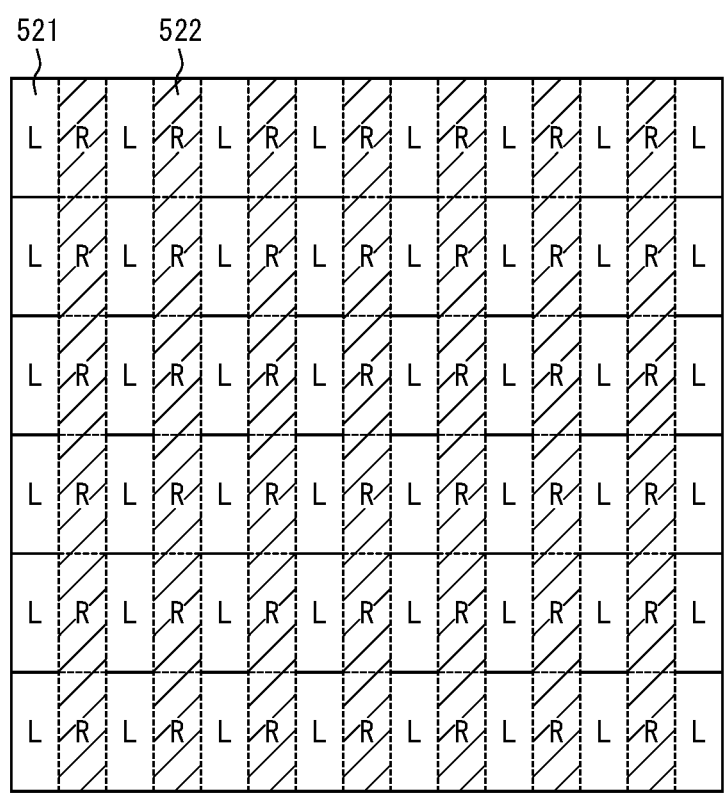
FIG. 5 is a diagram illustrating the display panel and the parallax barrier illustrated in FIG. 2 viewed from a parallax barrier side.

As described above, the user U apparently views the first virtual image 51 via the second virtual image 52, and the second virtual image serving as the virtual image of the parallax barrier 33 does not exist in reality. Hereinafter, however, the second virtual image 52 will be described as being apparently located at a position where the virtual image of the parallax barrier 33 is formed by the projection optical system 20 and the optical member 4a, and on the assumption that it is defined by the image light from the first virtual image 51. FIG. 5 illustrates subpixels of the first virtual image 51 of the display panel 32 that can be observed from the user U. The subpixels represented by L display the left-eye image. The subpixels represented by R display the right-eye image. FIG. 5 further illustrates the transmitting regions 522 and the light shielding surfaces 521 of the second virtual image 52 as observed from the left eye of the user U. The left eye of the user U views the subpixels represented by L displaying the left-eye image that overlap with the transmitting regions 522 and does not view the subpixels represented by R displaying the right-eye image that overlap with the light shielding surfaces 521. On the other hand, when observed from the right eye of the user U, the transmitting regions 522 overlap with the subpixels represented by R for displaying the right-eye image. When observed from the right eye of the user U, the light shielding surfaces 521 overlap with the subpixels represented by L displaying the left-eye image. Thus, the right eye of the user U views the right-eye image and does not view the left-eye image.

Figure 6A:
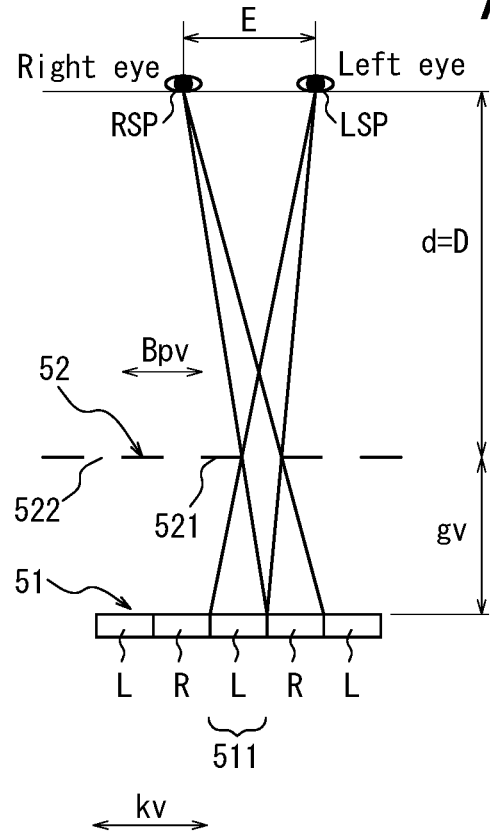
FIG. 6A is a schematic diagram for explaining subpixels of a first virtual image visible to eyes located at a reference position.
Figure 6B:
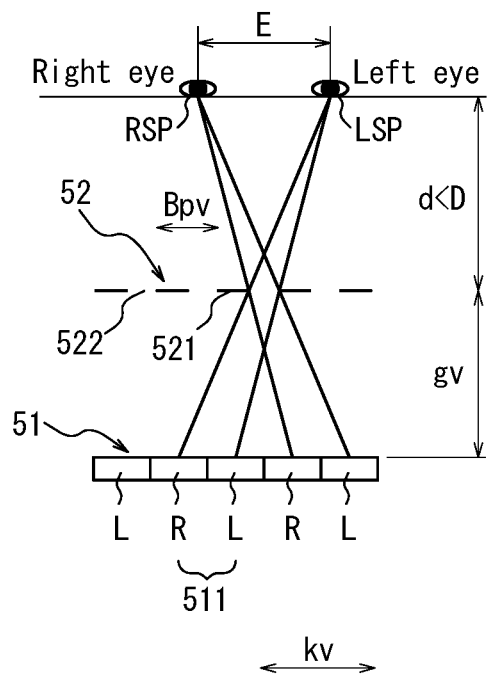
FIG. 6B is a schematic diagram for explaining subpixels of a first virtual image visible to the eyes when a distance between the parallax barrier and the eyes is shorter than a distance between the parallax barrier and the reference position.

Here, an apparent preferred viewing distance D between the second virtual image 52 serving as a virtual image of the parallax barrier 33 and the eyes of the user U (hereinafter, simply referred to as "preferred viewing distance D") will be described with reference to FIG. 6A to FIG. 6C. FIG. 6A to FIG. 6C can be said to be illustrating an apparent optical system between the first virtual image 51 serving as a virtual image of the display panel 32 and the user U. FIG. 6A to FIG. 6C illustrate the first virtual image 51, the second virtual image 52, and the eyes of the user U. For convenience of explanation, the following description uses the positional relationship illustrated in FIG. 6A to FIG. 6C. However, an actual ratio of the distance between the second virtual image 52 and the eyes of the user U to the distance between the first virtual image 51 and the second virtual image 52 is much greater than the distance ratios illustrated in FIG. 6A to FIG. 6C.

The preferred viewing distance D corresponds to a distance d between the second virtual image 52 and the eyes of the user U in an arrangement such that image light emitted from a left-eye image passes through the transmitting regions 332 and reaches the left eye as illustrated in FIG. 6A. The preferred viewing distance D may be determined by the interocular distance E of the user U, a pitch Bpv of the second virtual image 52, a distance gv between the second virtual image 52 and the first virtual image 51 (hereinafter, referred to as "virtual image gap gv"), and a relationship between an image pitch kv and the first virtual image 51.

When the distance d between the second virtual image 52 and the eye of the user U does not correspond to the preferred viewing distance D, an image viewed by the eye of the user U may become unclear.

For example, when the distance d is smaller than the preferred viewing distance D as illustrated in FIG. 6B, on the first virtual image 51 serving as the virtual image of the display panel 32, the regions 511 that are visible through the transmitting regions 522 are larger than the regions 511 that are visible through the transmitting regions 522 illustrated in FIG. 6A. Thus, light from at least some of the right-eye image reaches the left eye. In this manner, crosstalk occurs at the eyes of the user U.

When the distance d is greater than the preferred viewing distance D as illustrated in FIG. 6C, on the first virtual image 51 serving as the virtual image of the display panel 32, the regions 511 that are visible through the transmitting regions 522 are narrower than the regions 511 that are visible through the transmitting regions 522 illustrated in FIG. 6A. This reduces an amount of the image light that reaches the eyes of the user U. In this case also, a portion of image light of the right-eye image is mixed with image light to be viewed by the left eye, and a portion of image light of the left-eye image is mixed with image light to be viewed by the right eye.

In the first embodiment, the controller 35 changes the position of the display apparatus 30 in order to suppress crosstalk as described above. The operations performed by the controller 35 will be described in detail later.

Returning to FIG. 2, the communication interface 34 is a communication interface configured to receive position information regarding a position of the eyes from the detection apparatus 2. A physical connector or a wireless communication device may be employed as the communication interface 34. Mechanical connectors encompass electrical connectors for transmission of an electrical signal, optical connectors for transmission of an optical signal, or electromagnetic connectors for transmission of electromagnetic waves. Electrical connectors encompass connectors conforming to IEC60603, connector conforming to the USB standard, or connectors corresponding to an RCA jack. Electrical connectors encompass connectors corresponding to an S-terminal as defined in EIAJ CP-1211A, connectors corresponding to a D-terminal as defined in EIAJ RC-5237, connectors conforming to the HDMI® (HDMI is a registered trademark in Japan, other countries, or both) standard, or connectors corresponding to a coaxial cable including BNC. Optical connectors encompass a variety of connectors conforming to IEC 61754. Wireless communication devices includes those conforming to various standards including Bluetooth® (Bluetooth is a registered trademark in Japan, other countries, or both) or IEEE 802.11. The wireless communication device includes at least one antenna.

The controller 35 is connected to and is configured to control the driver 36. The controller 35 is configured as, for example, a processor. The controller 35 may include one or more processors. The processor may be configured as a general-purpose processor that reads a particular program and performs a particular function, or a specialized processor dedicated for a particular processing. The specialized processor may include an application-specific integrated circuit (ASIC: Application Specific Integrated Circuit). The processor may include a programmable logic device (PLD: Programmable Logic Device). The PLD may include an FPGA (Field-Programmable Gate Array). The controller 35 may be configured as a SoC or a SiP (System In a Package) in which one or more processors cooperate. The controller 35 may include a memory which stores various information and programs used for operating each constituent element of the display system 1. The memory may be configured as, for example, a semiconductor memory. The memory may function as a working memory of the controller 35.

The controller 35 causes to change a position of the display apparatus 30 based on a position of the eyes of the user U in order to suppress the occurrence of crosstalk. When the communication interface 34 receives the position information, the controller 35 is configured to perform a first operation for changing the position of the display apparatus 30 based on the position of the eyes with respect to a beam direction (hereinafter, referred to as "depth direction") of image light that reaches the eye of the user U. Here, the first operation will be described in detail.

In order to suppress the occurrence of crosstalk, the controller 35 is configured to control the driver 36 to cause positions of the first virtual image 51 of the display panel 32 and the second virtual image 52 of the parallax barrier 33 to change. The controller 35 cause to displace the display apparatus 30 along the direction normal to the display surface 321. At this time, the display apparatus 30 may be displaced maintaining the relative positional relationship between the display panel 32 and the parallax barrier 33. In the first embodiment, displacement of the display apparatus 30 means displacement of at least one of the display panel 32 and the parallax barrier 33.

In particular, when the eyes of the user U are displaced in a direction approaching the optical member 4a, the controller 35 controls the driver 36 to cause the display apparatus 30 to be displaced in a direction away from the projection optical system 20. The first virtual image 51 and the second virtual image 52 are magnified by the projection optical system 20. Thus, the displacement amounts of the first virtual image 51 and the second virtual image 52 that are displaced in accordance with the displacement of the display panel 32 and the parallax barrier 33 are larger than the displacement amounts of the display panel 32 and the parallax barrier 33. Accordingly, the controller 35a displaces the display apparatus 30 in a direction away from the projection optical system 20 by a displacement amount that is smaller than that of the eye of the user U such that the distance between the eyes of the user U and the second virtual image 52 is maintained at the apparent preferred viewing distance.

When the eyes of the user U are displaced in a direction away from the optical member 4a, the controller 35 controls the driver 36 to cause the display apparatus 30 to be displaced in a direction approaching the projection optical system 20. At this time, the controller 35 displaces the display apparatus 30 by a displacement amount that is smaller than that of the eyes of the user U such that the display apparatus 30 approaches the projection optical system 20 in a direction in which the distance between the eye of the user U and the second virtual image 52 is maintained at the apparent preferred viewing distance.

The driver 36 displaces the display apparatus 30 based on the control by the controller 35 as described above. The driver 36 includes, for example, a stage 361, a motor 362 (a driving element), and the like as illustrated in FIG. 2. The stage 361 is arranged at a position within the housing 10 that does not interfere with the optical path of image light. At least one of the display panel 32 and the parallax barrier 33 is fixedly attached to the stage 361. The motor 362 drives the stage 361 such that the stage 361 is displaced along the direction normal to the display surface 321. Thus, the display panel 32 and the parallax barrier 33 fixedly attached to the stage 361 are displaced together with the displacement of the stage 361.

The controller 35 performs a second operation for displaying one of the right-eye image and the left-eye image in each subpixel based on the position of the eye within a plane perpendicular to the depth direction. Here, the second operation will be described in detail.

The controller 35 determines subpixels for displaying the left-eye image and subpixels for displaying the right-eye image based on a horizontal displacement of an eye of the user U detected by the detection apparatus 2 from a reference position within the plane perpendicular to the depth direction. A reference position for the left eye corresponds to a position where, in a state in which the display panel 32 and the parallax barrier 33 have a predetermined positional relationship, image light from the left-eye image on the display panel 32 reaches the left eye and image light from the right-eye image is blocked by the parallax barrier 33 and does not reach the left eye. A reference position for the right eye corresponds to a position where image light from the right-eye image on the display panel 32 reaches the right eye and image light from the left-eye image is blocked by the parallax barrier 33 and does not reach the right eye. Hereinafter, the reference position of the left eye will be referred to as a left reference position LSP. The reference position of the right eye will be referred to as a right reference position RSP.

Hereinafter, a method used by the controller 35 to determine subpixels for displaying the left-eye image based on the displacement of the position of the left eye from the left reference position LSP will be described. A similar method is employed by the controller 35 to determine subpixels for displaying the right-eye image based on the displacement of the position of the right eye from the right reference position RSP.

A virtual image viewed by the left eye of the user U at a position horizontally displaced from the left reference position LSP will be described. As already described with reference to FIG. 3, the left-eye image is displayed by each of the subpixels successively arranged in the second direction in every other column. The right-eye image is displayed by each of the subpixels successively arranged in the second direction in every other column adjacent to the subpixels displaying the left-eye image. The subpixels adjacent to the subpixels displaying the right-eye image display left-eye image. This pattern is repeated. Hereinafter, a predetermined column and the columns alternately arranged relative to the predetermined column will be referred to as a first column group. The columns arranged adjacent to the first column group will be referred to as a second column group. In FIG. 3, first column group subpixels display the left-eye image, and second column group subpixels display the right-eye image.

When the left eye of the user U is located at the left reference position LSP, image light emitted from the left-eye image passes through the transmitting regions 332 of the parallax barrier 33, reflects from the optical member 4a, and then reaches the left eye. Thus, the left eye of the user U views a virtual image of the left-eye image represented by L as illustrated in FIG. 6A. Similarly, image light emitted from the right-eye image passes through the transmitting regions 332 of the parallax barrier 33, reflects from the optical member 4a, and then reaches the right eye. Thus, the right eye of the user U views a virtual image of the right-eye image represented by R.

Figure 7A:
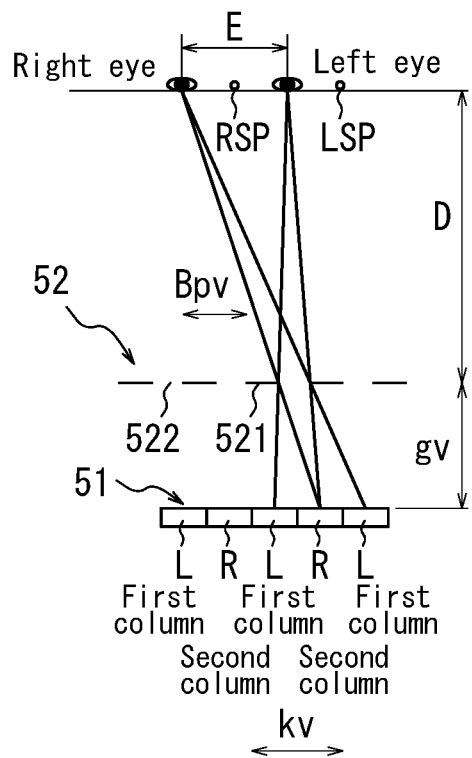
FIG. 7A is a schematic diagram illustrating subpixels of the first virtual image viewed by the eyes when the eyes are displaced from the reference position by half an interocular distance in the horizontal direction.

When the left eye of the user U is displaced by half the interocular distance E from the left reference position LSP as illustrated in FIG. 7A, image light emitted from some of the left-eye image displayed in the first column group and image light emitted from some of the right-eye image displayed in the second column group reach the left eye. Similarly, image light emitted from some of the left-eye image displayed in the first column group and image light emitted from some of the right-eye image displayed in the second column group reach the right eye. Thus, the left eye of the user U views a portion of the virtual image of the right-eye image represented by R and a portion of the virtual image of the left-eye image represented by L. That is, crosstalk occurs and hinders the user from viewing a normal three-dimensional image.

Figure 7B:
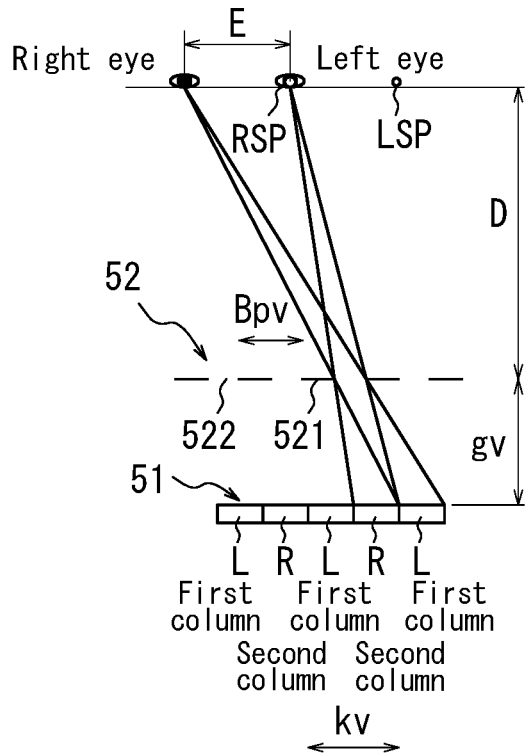
FIG. 7B is a schematic diagram illustrating subpixels of the first virtual image viewed by the eyes when the eyes are displaced from the reference position by the interocular distance in the horizontal direction.

When the left eye of the user U is displaced by the interocular distance E from the left reference position LSP as illustrated in FIG. 7B, image light emitted from the left-eye image displayed in the first column group passes through the transmitting regions 332 of the parallax barrier 33 and reaches the right eye. Image light emitted from the right-eye image displayed in the second column group passes through the transmitting regions 332 of the parallax barrier 33 and reaches the left eye. Thus, the left eye of the user U views a virtual image of the right-eye image represented by R. The right eye of the user U views a virtual image of the left-eye image represented by L. That is, a so-called image reversal occurs and hinders the user from viewing a normal three-dimensional image.

Figure 7C:
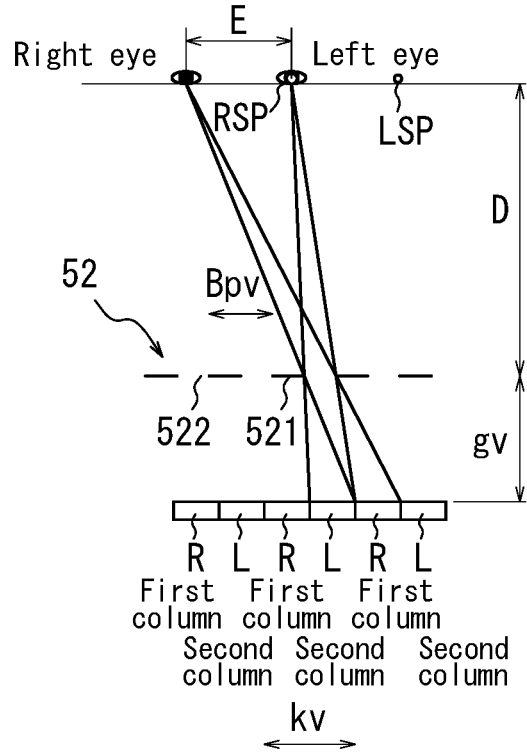
FIG. 7C is a schematic diagram illustrating subpixels of the first virtual image viewed by the eyes when the eyes are displaced from the reference position by the interocular distance in the horizontal direction and positions of a right eye images and a left eye image are changed.

As such, the controller 35 causes the first column group subpixels of the display surface 321 to display the right-eye image and the second column group subpixels to display the left-eye image. Thus, image light emitted from the left-eye image passes through the transmitting regions 332 of the parallax barrier 33 and reaches the left eye. Also, image light emitted from the right-eye image passes through the transmitting regions 332 of the parallax barrier 33 and reaches the right eye. In this case, the left eye of the user U views the virtual image of the left-eye image represented by L as illustrated in FIG. 7C. The right eye of the user U views the virtual image of the right-eye image represented by R. Thus, the image reversal is prevented, and the user U can view a normal three-dimensional image.

Figure 7D:
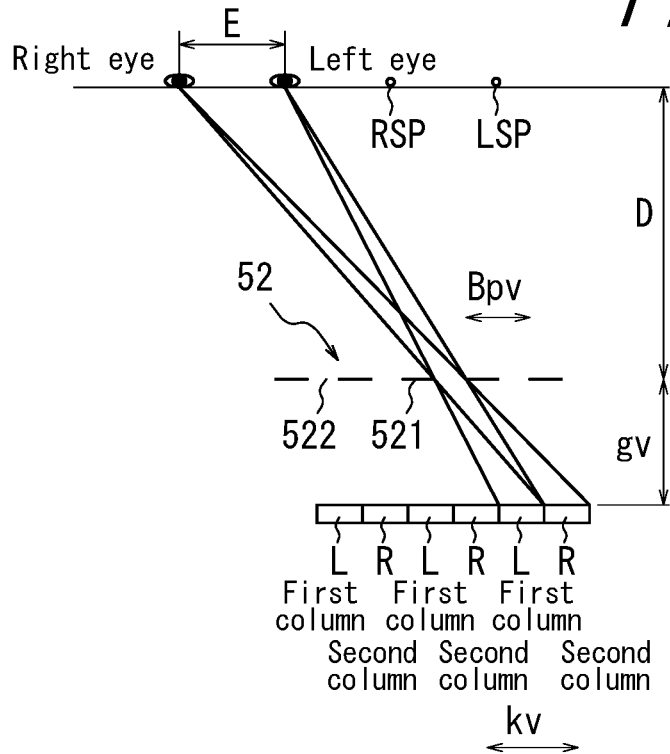
FIG. 7D is a schematic diagram illustrating subpixels of the first virtual image viewed by the eyes when the eyes are displaced from the reference position by double the interocular distance in the horizontal direction.
Figure 8:
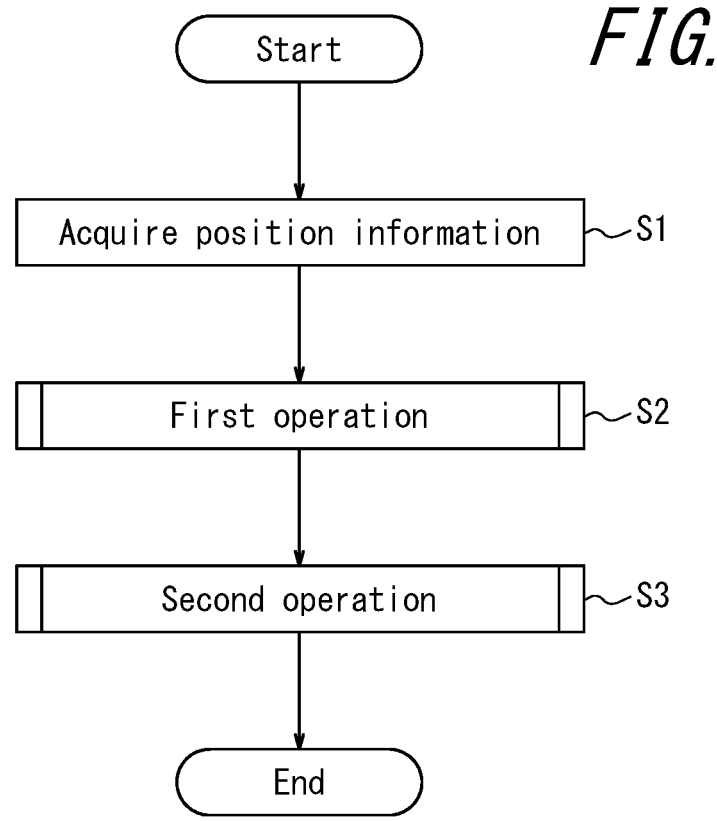
FIG. 8 is a flow chart illustrating an operation for displacing the display apparatus performed by a controller.

When the left eye of the user U is displaced by double the interocular distance E from the left reference position LSP as illustrated in FIG. 7D, image light emitted from the left-eye image displayed in the first column group passes through the transmitting regions 332 of the parallax barrier 33 and reaches the left eye. Image light emitted from the right-eye image displayed in the second column group passes through the transmitting regions 332 of the parallax barrier 33 and reaches the right eye. Thus, the left eye of the user U views the virtual image of the left-eye image represented by L, and the right eye of the user U views the virtual image of the right-eye image represented by R. In this way, the occurrence of crosstalk is suppressed, and the user can view a normal three-dimensional image.

Accordingly, the controller 35 determines whether to display the left-eye image or the right-eye image for each of the subpixels based on the positions of the eyes of the user U, in order to suppress crosstalk and image reversal. Hereinafter, a method for displaying an image based on the position of the left eye employed by the controller 35 will be described. A similar method is applicable to displaying an image based on the position of the right eye.

When the left eye is located at a position where more image light from the second column group reaches than image light from the first column group, the controller 35 causes the second column group subpixels to display the left-eye image.

In particular, when the position of the left eye is horizontally displaced from the reference position by a distance $E/2$ or more and less than $3E/2$, more image light emitted from the second column group subpixels reaches the left eye than image light emitted from the first column group subpixels. Thus, the controller 35 causes the second column group subpixels to display the left-eye image and the first column group subpixels to display the right-eye image.

When the position of the left eye is horizontally displaced from the reference position by a distance $3E/2$ or more and less than $5E/2$, more image light emitted from the first column group subpixels reaches the left eye than image light emitted from the second column group subpixels. Thus, the controller 35 causes the first column group subpixels to display the left-eye image and the second column group subpixels to display the right-eye image.

When the position of the left eye is horizontally displaced from the reference position within a predetermined distance range, more image light emitted from the second column group subpixels reaches the left eye than image light emitted from the first column group subpixels. The predetermined distance range is $(4k-3) \times E/2$ or more and less than $(4k-1) \times E/2$ (where k is an integer). In this case, the controller 35 causes the second column group subpixels to display the left-eye image and the first column group subpixels to display the right-eye image.

When the position of the left eye is horizontally displaced out of the predetermined distance range from the reference position, image light emitted from the first column group subpixels reaches the left eye more than image light emitted from the second column group subpixels. In this case, the controller 35 causes the first column group subpixels to display the left-eye image and the second column group subpixels to display the right-eye image.

Next, an operation for displacing the display apparatus 30 performed by the controller 35 according to the first embodiment will be described. The controller 35 initiates this operation when the communication interface 34 receives the position information regarding the position of the eye of the user U.

First, the controller 35 acquires the position information detected by the detection apparatus 2 and received by the communication interface 34 (step S1).

Figure 9:
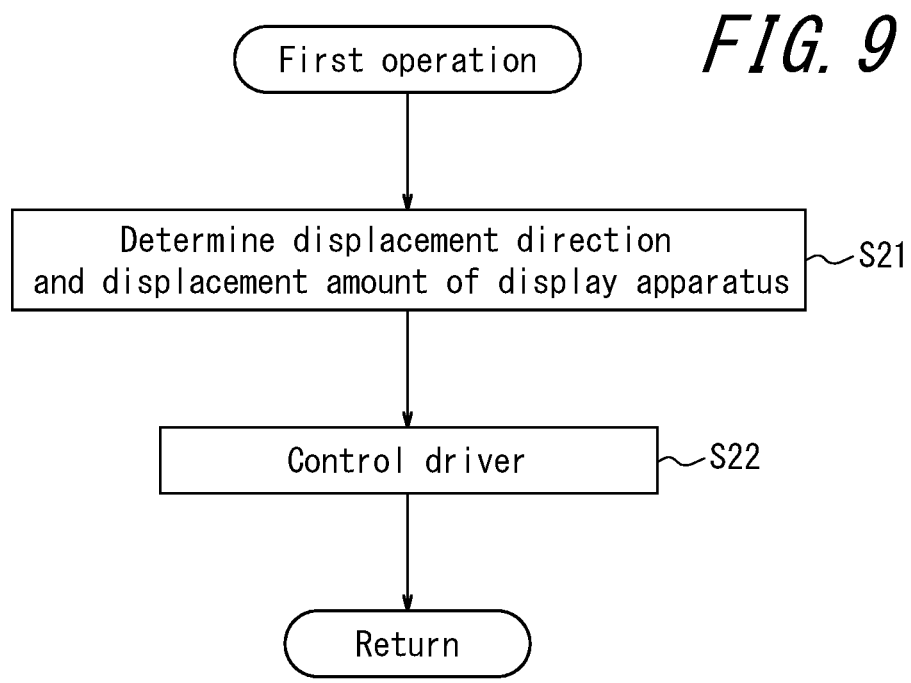
FIG. 9 is a flow chart illustrating a first operation in detail.

When the position information is acquired in step S1, the controller 35 performs the first operation based on the position of the left eye in the depth direction (step S2). Here, the first operation will be described in detail with reference to FIG. 9.

In the first operation, the controller 35 determines the displacement direction and the displacement amount of the display apparatus 30 based on the displacement direction and the displacement amount of the position of the eye of the user U from the reference position in the beam direction of the image light that reaches the eye of the user U (step S21). The controller 35 may store an appropriate displacement amount of the display apparatus 30 corresponding to the position of the eye of the user U in the depth direction as a table in memory in advance and determine the displacement amount based on the table.

When the displacement direction of the display apparatus 30 is determined in step S21, the controller 35 controls the driver 36 to displace the display apparatus 30 by the determined displacement amount in the determined direction (step S22).

Figure 10:
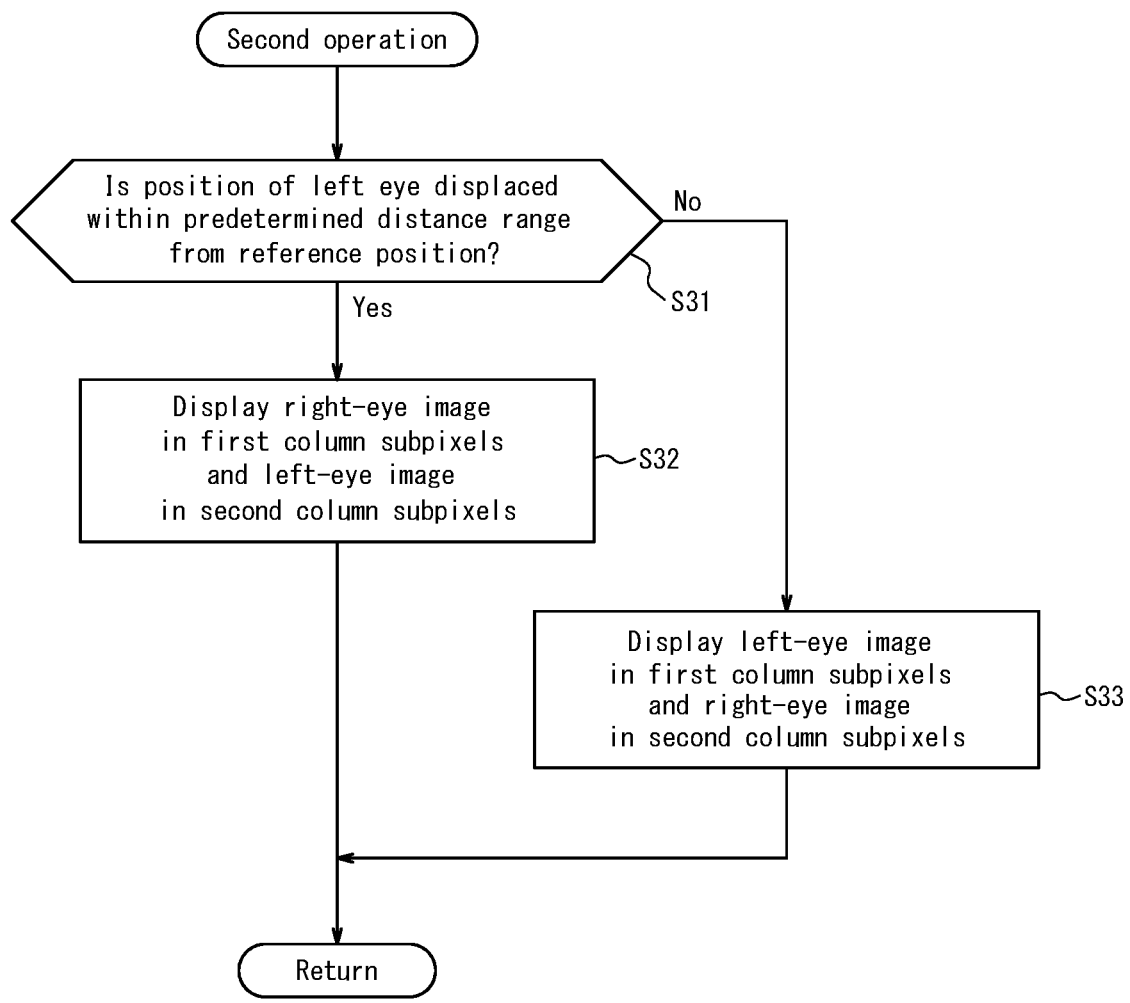
FIG. 10 is a flow chart illustrating a second operation in detail.

After performing the first operation in step S2, the controller 35 performs a second operation based on the position of the eye within the plane perpendicular to the depth direction (step S3). The second operation will be described in detail below with reference to FIG. 10.

In the second operation, the controller 35 determines whether the position of the left eye is within the predetermined distance range from the reference position (step S31).

When the controller 35 determines that the position of the left eye is within the predetermined distance range from the reference position in step S31, the controller 35 causes the first column group subpixels to display the right-eye image and the second column group subpixels to display the left-eye image (step S32).

When the controller 35 determines that the position of the left eye is not within the predetermined distance range from the reference position in step S31, the controller 35 causes the first column group subpixels to display the left-eye image and the second column group subpixels to display the right-eye image (step S33).

After performing the second operation in step S3, the controller 35 returns to step S1 to acquire the position information received again by the communication interface 34 and repeats the subsequent procedure.

According to the first embodiment as described above, the display apparatus 30 displaces the display panel 32 and the parallax barrier 33 along the direction normal to the display surface 321 while maintaining the relative positional relationship therebetween. Thus, crosstalk that occurs when the user U moves in the depth direction can be suppressed.

According to the first embodiment, the display apparatus 30 causes the driver 36 to displace the display panel 32 and the parallax barrier 33 based on the position of the eye. Thus, the occurrence of crosstalk can be reliably suppressed.

According to the first embodiment, the display apparatus 30 determines whether to display the right-eye image or the left-eye image for each of subpixels based on the position of the eye within the plane perpendicular to the depth direction. Thus, the subpixels viewed by the right eye of the user U can display the right-eye image, and the subpixels viewed by the left eye can display the left-eye image. Accordingly, crosstalk and reverse view can be suppressed.

Next, a second embodiment of the present disclosure will be described in detail with reference to the drawings.

A display system 1 according to the second embodiment of the present disclosure includes a detection apparatus 2 and a projection apparatus 3. In a manner similar to the projection apparatus 3 of the first embodiment illustrated in FIG. 1, the projection apparatus 3 is mounted in the mobile body 4. For example, the projection apparatus 3 is accommodated in the dashboard of the mobile body 4. In the second embodiment, configurations different from those of the first embodiment will be described. Configurations similar to those of the first embodiment will be omitted.

Figure 11:
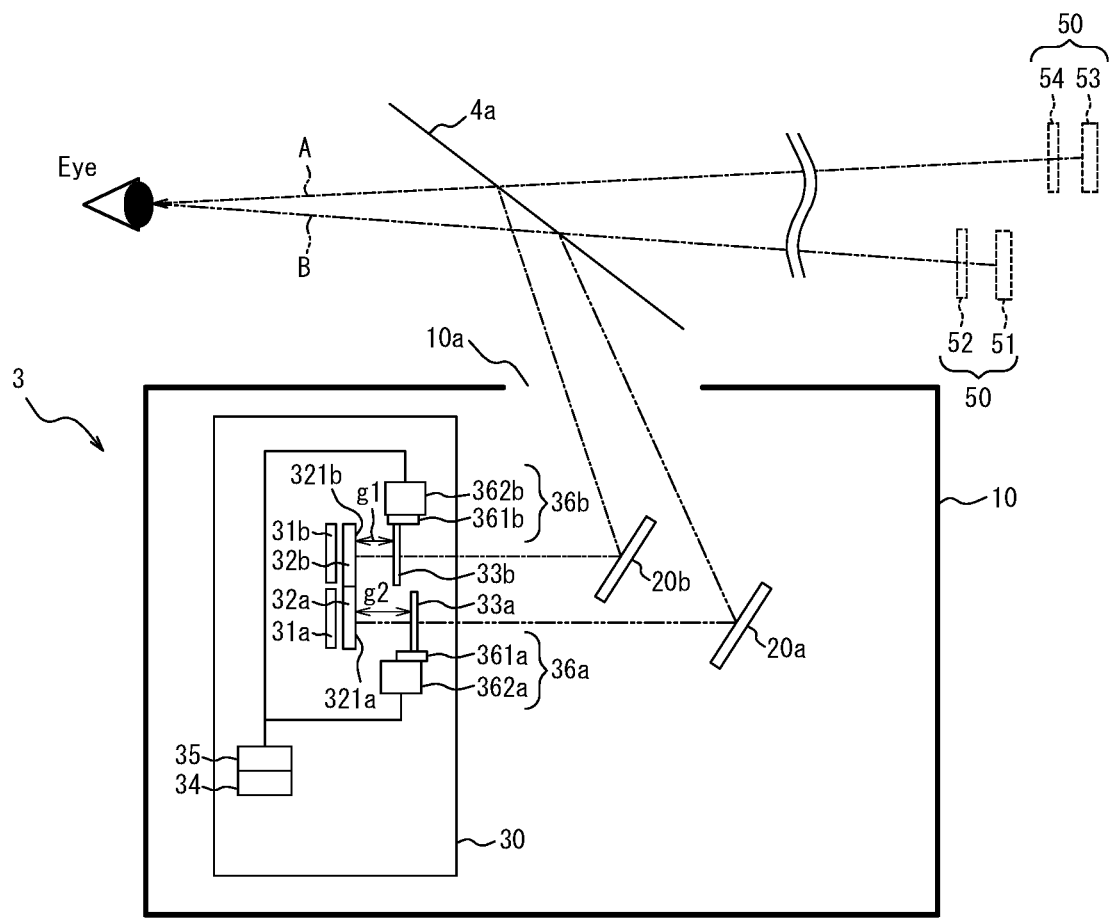
FIG. 11 is a diagram illustrating a schematic configuration of a display apparatus according to a second embodiment of the present disclosure.

The projection apparatus 3 according to the second embodiment will be described in detail with reference to FIG. 11. The projection apparatus 3 according to the second embodiment includes a housing 10, a first projection optical system 20a, a second projection optical system 20b, and a display apparatus 30.

Each of the first projection optical system 20a and the second projection optical system 20b are configured in a manner similar to the projection optical system 20 of the first embodiment.

The display apparatus 30 is accommodated in the housing 10 and is configured to emit image light. The display apparatus 30 includes a first emitter (emitter) 31a, a second emitter 31b, and a first display panel 32a and the second display panel 32b serving as display elements. The display apparatus 30 further includes a first parallax barrier 33a and a second parallax barrier 33b serving as optical elements, a communication interface 34, a controller 35, a first driver (driver) 36a, and a second driver 36b.

The first emitter 31a irradiates the surface of the first display panel 32a that constitutes a portion of the display panel 32. The second emitter 31b irradiates the surface of the first display panel 32a that constitutes a portion of the display panel 32. The first emitter 31a and the second emitter 31b have the same configuration as the emitter 31 of the first embodiment other than the features thereof particularly described.

Each of the first display panel 32a and the second display panel 32b has a configuration similar to that of the display panel 32 of the first embodiment. The first display panel 32a and the second display panel 32b have the same configuration as the display panel 32 of the first embodiment other than the features thereof particularly described.

The first parallax barrier 33a allows first image light emitted from some of the subpixels of the first display panel 32a to pass therethrough and reach the position of the left eye of the user U. The first parallax barrier 33a allows first image light emitted from other subpixels of the first display panel 32a to pass therethrough and reach the position of the right eye of the user U. The first parallax barrier 33a is arranged at a distance g1 (hereinafter, referred to as "gap g1") from a display surface 321a of the first display panel 32a as illustrated in FIG. 11.

The second parallax barrier 33b allows second image light emitted from some of the subpixels of the second display panel 32b to pass therethrough and reach the position of the left eye of the user U. The second parallax barrier 33b allows second image light emitted from other subpixels of the second display panel 32b of the display panel 32 to pass therethrough and reach the position of the right eye of the user U. The second parallax barrier 33b is arranged at a distance g2 (hereinafter, referred to as "gap g2") from the display surface 321b of the second display panel 32b.

The first parallax barrier 33a and the second parallax barrier 33b have the same configurations as the configuration of the parallax barrier 33 of the first embodiment other than the features thereof particularly described.

According to the above configuration, the first image light emitted from the first display panel 32a reaches the optical member 4a via the first parallax barrier 33a and the first projection optical system 20a and forms the first virtual image 51 viewed by the eyes of the user U. Similarly, the second image light emitted from the second display panel 32b reaches the optical member 4a via the second parallax barrier 33b and the second projection optical system 20b and forms a third virtual image 53 viewed by the eye of the user U. An optical path length from the display panel 32 to the optical member 4a is appropriately designed such that the third virtual image 53 is formed more distant than the first virtual image 51 when viewed from the eye of the user U, and the constituent elements are arranged accordingly.

An image displayed by the display panel 32 may be designed such that a distance between the eyes of the user U and an area of the third virtual image close to the first virtual image 51 and a distance between the eyes of the user U and an area of the first virtual image 51 close to the third virtual image 53 fall within a predetermined range. In this way, a break generated between the first virtual image 51 and the third virtual image 53 can be suppressed, and the user U can view a virtual image of a three-dimensional image having high stereoscopic effect as a whole.

In the second embodiment, an apparent preferred viewing distance D (hereinafter, simply referred to as "preferred viewing distance D") between the first virtual image 51 and the eye of the user U will be described with reference to FIG. 6. Here, the preferred viewing distance D of the first virtual image 51 will be described. However, a similar description applies to a preferred viewing distance of the second virtual image 52.

As described above, the controller 35 displaces the first parallax barrier 33a based on the position of the eye of the user U in order to suppress the occurrence of crosstalk and image reversal. As described above, the controller 35 according to the first embodiment displaces at least the display panel 32 and the parallax barrier 33 of the display apparatus 30 while maintaining the relative positional relationship between the display panel 32 and the parallax barrier 33. On the other hand, the controller 35 according to the second embodiment is different from the first embodiment in terms of displacing the first parallax barrier 33a alone while the first display panel 32a is fixed.

In particular, when the communication interface 34 receives the position information, the controller 35 performs a first operation to displace the first parallax barrier 33a with respect to the display surface 321a based on the position of the eyes in the depth direction. Here, the first operation will be described in detail.

The controller 35 controls the first driver 36a to displace the position of the second virtual image 52 serving as a virtual image of the first parallax barrier 33a in order to suppress the occurrence of crosstalk and image reversal. Thus, the controller 35 causes displacement of the first parallax barrier 33a along the direction normal to the display surface 321a of the first display panel 32a.

Figure 6D:
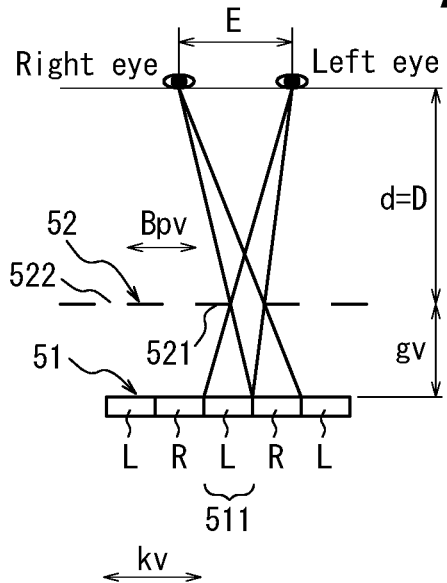
FIG. 6D is a schematic diagram illustrating an example in which a distance between the eyes at a position illustrated in FIG. 6B and a virtual image of the parallax barrier corresponds to a preferred viewing distance.

In particular, when the eye of the user U is displaced in a direction approaching the optical member 4a as illustrated in FIG. 6B, the controller 35 controls the first driver 36a to displace the first parallax barrier 33a in a direction approaching the display panel 32 as illustrated in FIG. 6D. By adjusting the position of the first parallax barrier 33a, crosstalk and image reversal can be suppressed.

Figure 6E:
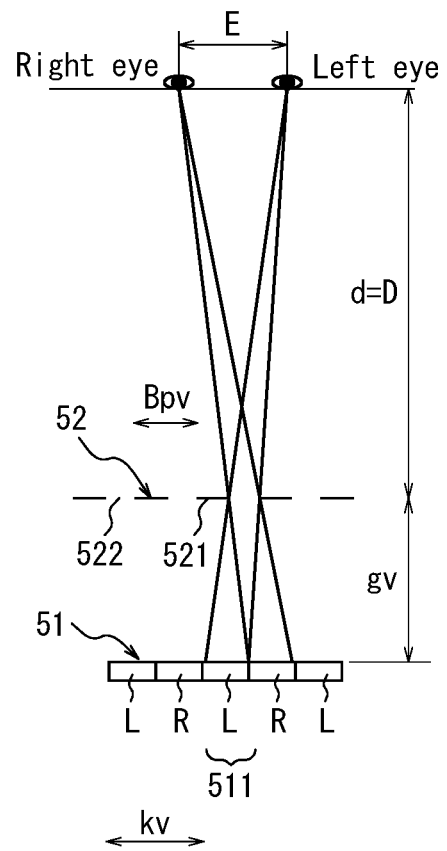
FIG. 6E is a schematic diagram illustrating an example in which a distance between the eyes at a position illustrated in FIG. 6C and the virtual image of the parallax barrier corresponds to the preferred viewing distance.

When the eye of the user U is displaced in a direction away from the optical member 4a as illustrated in FIG. 6C, the controller 35 controls the first driver 36a to displace the first parallax barrier 33a in a direction away from the display panel 32 as illustrated in FIG. 6E.

The controller 35 controls the second driver 36b in order to suppress crosstalk and a reduction in the light intensity of the third virtual image 53 generated by second image light emitted from the second display panel 32b. In particular, the controller 35 controls the second driver 36b to displace a position of a fourth virtual image 54 serving as a virtual image of the second parallax barrier 33b. Thus, the controller 35 causes displacement of the second parallax barrier 33b along the direction normal to the display surface 321b of the second display panel 32b. The details of the method for displacing the second parallax barrier 33b employed by the controller 35 are similar to those of the method for displacing the first parallax barrier 33a described above.

The first driver 35a displaces the first parallax barrier 33a based on the control by the controller 35. The first driver 36a includes, for example, a first stage 361a, a first motor (a driving element) 362a, and the like, as illustrated in FIG. 11. The first stage 361a is arranged at a position within the housing 10 that does not interfere with the optical path. The first parallax barrier 33a is fixedly attached to the first stage 361a. The first motor 362a drives the first stage 361a such that the first stage 361a is displaced along the direction normal to the display surface 321a of the first display panel 32a. Thus, the first parallax barrier 33a fixedly attached to the first stage 361a is displaced together with the displacement of the first stage 361a.

The second driver 36b displaces the second parallax barrier 33b based on the control by the controller 35. The second driver 36b includes, for example, a second stage 361b, a second motor (a driving element) 362b, and the like as illustrated in FIG. 11. The second stage 361b is arranged at a position within the housing 10 that does not interfere with the optical path. The second parallax barrier 33b is fixedly attached to the second stage 361b. The second motor 362b drives the second stage 361b such that the second stage 361b is displaced along the direction normal to the display surface 321a of the second display panel 32b. Thus, the second parallax barrier 33b fixedly attached to the second stage 361b is displaced together with the displacement of the second stage 361b.

The controller 35 performs a second operation for causing each subpixel to display the right-eye image or the left-eye image based on the position of the eye within the plane approximately perpendicular to the beam direction of the image light that reaches the eye of the user U. The second operation is the same as that of the first embodiment.

Next, the operation for controlling the display apparatus 30 performed by the controller 35 of the second embodiment will be described with reference to the drawings. In the operations performed by the controller 35 of the second embodiment, only the first operation performed by the controller 35 of the first embodiment is different.

Figure 12:
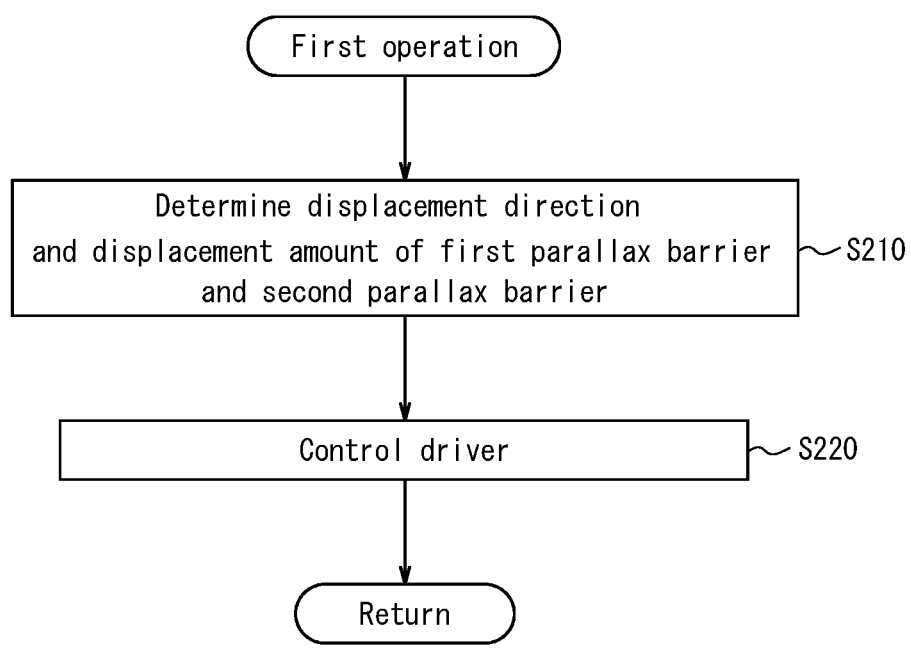
FIG. 12 is a flow chart illustrating a first operation performed by a controller illustrated in FIG. 11 in detail.

In the first operation, the controller 35 determines the displacement direction and the displacement amount of the first parallax barrier 33a based on the displacement direction and the displacement amount of the position of the eyes of the user U in the depth direction from the reference position as illustrated in FIG. 12. In the first operation, the controller 35 determines the displacement direction and the displacement amount of the second parallax barrier 33b based on the displacement direction and the displacement amount of the position of the eyes of the user U in the depth direction from the reference position (step S210).

When the displacement direction of the display apparatus 30 is determined in step S210, the controller 35 controls the first driver 36a to displace the first parallax barrier 33a in the determined direction. When the displacement direction of the display apparatus 30 is determined in step S210, the controller 35 controls the second driver 36b to displace the second parallax barrier 33b in the determined direction (step S220).

According to the second embodiment, as described above, the display apparatus 30 displaces the first parallax barrier 33a and the second parallax barrier 33b along the direction normal to the display surface 321 of the display panel 32 without displacing the display panel 32. Thus, when the display apparatus 30 displays two virtual images 50 at different distances from the eye of the user U, occurrence of crosstalk and a reduction in the light intensity of each of the virtual images 50 can be suppressed.

According to the second embodiment, the display apparatus 30 displaces the first parallax barrier 33a and the second parallax barrier 33b using the first driver 36a and the second driver 36b to respectively, based on the position of the eyes in the depth direction. Thus, when the display apparatus 30 displays two virtual images 50 at different distances from the eye of the user U, occurrence of crosstalk and a reduction in the light intensity of each of the virtual images 50 can be suppressed.

According to the second embodiment, the display apparatus 30 causes each of subpixels to display the right-eye image or the left-eye image based on the position of the eye within the plane perpendicular to the depth direction. Thus, the subpixels viewed by the right eye of the user U display the right-eye image, and the subpixels viewed by the left eye display the left-eye image. Accordingly, occurrence of crosstalk and image reversal can be suppressed.

Although the above embodiments are described as typical examples, it should be apparent to those skilled in the art that various modifications and alterations can be made without departing from the gist and scope of the present disclosure. Accordingly, the present disclosure should not be construed as being limited to the embodiments described above and may be varied or modified in various manners. For example, constituent blocks described in the embodiments can be combined together, or one constituent block can be subdivided.

Although the controller 35 sequentially performs the first operation and the second operation in the above embodiments, this is not restrictive. For example, the controller 35 can perform the second operation before the first operation. The controller 35 may perform only one of the first operation and the second operation.

In the above embodiments, the optical element for defining the beam direction of image light emitted from the subpixels is not limited to the parallax barrier and may be a lenticular lens or the like. The lenticular lens may have a configuration in which cylindrical lenses extending in the second direction are arranged in the first direction. "Strip-shaped regions extending in the second direction" may include a portion extending in the first direction. "Strip-shaped regions extending in the second direction" is not included when parallel to the first direction. "Strip-shaped regions extending in the second direction" may extend obliquely to the second direction.

In the above embodiments, the detection apparatus 2 is configured to detect the position of the left eye. The controller 35 causes each of the subpixels of the display panel 32 to display the left-eye image or the right-eye image based on the position of the left eye. However, this is not restrictive. For example, the detection apparatus 2 may detect a position of the right eye. In this case, the controller 35 may cause each of the subpixels of the display panel 32 to display the left-eye image or the right-eye image based on the position of the right eye.

Although the display apparatus 30 of the second embodiment includes the first parallax barrier 33a and the second parallax barrier 33b, this is not restrictive. For example, the display apparatus 30 may include the first parallax barrier 33a alone and omit the second parallax barrier 33b. In this case, the display apparatus 60 may omit the second emitter 31b, the second display panel 32b, and the second driver 36b. The projection apparatus 3 may omit the second projection optical system 20b.

REFERENCE SIGNS LIST 1 display system
2 detection apparatus
3 projection apparatus
4 mobile body
4a optical member
10 housing
10a opening
20 projection optical system
30, 60 display apparatus
31 emitter
31a first emitter
31b second emitter
32 display panel
32a first display panel
32b second display panel
321 display surface
33 parallax barrier
33a first parallax barrier
33b second parallax barrier
331 light shielding surface
332 transmitting region
34 communication interface
35 controller
36 driver
361 stage
36a first driver
36b second driver
361a first stage
361b second stage
362 motor
362a first motor
362b second motor
50 virtual image
51 first virtual image
52 second virtual image
53 third virtual image
54 fourth virtual image

The invention claimed is:
1. A display apparatus comprising:
a display element that includes a display surface having subpixels arranged in a grid pattern along a first direction and a second direction approximately orthogonal to the first direction;

an optical element configured to define a beam direction of image light emitted from the subpixels in each of strip-shaped regions extending in the second direction on the display surface;
a projection optical system configured to project the image light having the beam direction defined by the optical element to form a virtual image of the display surface;
a driver configured to displace the optical element along a direction normal to the display surface; and
a controller configured to displace the optical element using the driver.

2. The display apparatus according to claim 1, wherein
the driver is configured to displace the display surface while maintaining a positional relationship between the display surface and the optical element; and
the controller is configured to displace the display surface using the driver.

3. The display apparatus according to claim 1, wherein
the driver includes a stage to which the display surface and the optical element are fixed and a driving element for driving the stage in the direction normal to the display surface, and
the controller is configured to displace the display surface and the optical element by driving the stage using the driving element.

4. The display apparatus according to claim 1, wherein
the driver is configured to displace the optical element relative to the display surface.

5. The display apparatus according to claim 4, wherein
the driver includes a stage to which the optical element is attached, and a driving element for driving the stage in the direction normal to the display surface, and
the controller is configured to displace the optical element by driving the stage using the driving element.

6. The display apparatus according to claim 1, comprising
a communication interface configured to receive position information indicating a position of an eye of a user, wherein
the controller is configured to displace the optical element using the driver, based on the position of the eye received by the communication interface.

7. The display apparatus according to claim 6, wherein
the controller is configured to displace the optical element along the direction normal to the display surface using the driver, based on the position of the eye in the beam direction of the image light that reaches the eye of the user.

8. The display apparatus according to claim 6, wherein
the controller is configured to determine which of a left-eye image to be viewed by a left eye and a right-eye image to be viewed by a right eye to be displayed by each of subpixels, based on the position of the eye of user within a plane perpendicular to the beam direction of the image light that reaches the eye of the user.

9. The display apparatus according to claim 8, wherein
the controller causes a first set of the subpixels successively arranged in a second direction in every other columns arranged in a first direction to display one of the right-eye image, and the left-eye image and a second set of the subpixels in columns that are adjacent to the every other columns to display the other one of the right-eye image and the left-eye image.

10. A display system comprising:
an imaging apparatus configured to capture an image of a user; and
a display apparatus that includes:
a communication interface configured to receive position information regarding a position of an eye of the user captured by the imaging apparatus;
a display element that includes a display surface having subpixels arranged in a grid pattern along a first direction and a second direction approximately orthogonal to the first direction;
an optical element configured to define a beam direction of image light emitted from the subpixels in each of strip-shaped regions extending in the second direction on the display surface;
a projection optical system configured to project the image light having the beam direction defined by the optical element to form a virtual image of the display surface;
a driver configured to displace the optical element along a direction normal to the display surface; and
a controller configured to displace the optical element using the driver.

11. A mobile body equipped with a display system, the display system comprising:
an imaging apparatus configured to capture an image of a user; and
a display apparatus that includes:
a communication interface configured to receive position information regarding a position of an eye of the user captured by the imaging apparatus;
a display element that includes a display surface having the subpixels arranged in a grid pattern along a first direction and a second direction approximately orthogonal to the first direction;
an optical element configured to define a beam direction of the image light emitted from subpixels in each of strip-shaped regions extending in the second direction on the display surface;
a projection optical system configured to project image light having the beam direction defined by the optical element to form a virtual image of the display surface;
a driver configured to displace the optical element along a direction normal to the display surface; and
a controller configured to displace the optical element using the driver.

12. The display apparatus according to claim 1, wherein
the driver is configured to move the optical element along the direction normal to the display surface to thereby be closer to or further away from the projection optical system.

13. The display system according to claim 10, wherein
the driver is configured to move the optical element along the direction normal to the display surface to thereby be closer to or further away from the projection optical system.

14. The mobile body equipped with a display system according to claim 11, wherein
the driver is configured to move the optical element along the direction normal to the display surface to thereby be closer to or further away from the projection optical system.

* * * * *